United States Patent [19]

Sattler et al.

[11] Patent Number: 5,504,807
[45] Date of Patent: Apr. 2, 1996

[54] TELEPHONE APPARATUS WITH A CONTINUOUSLY-CONNECTED DC-ISOLATED MODEM

[75] Inventors: Peter Sattler; Victor Kravtchenko; Christian Krexner, all of Vienna, Austria

[73] Assignee: U.S. Philips Corporation, New York, N.Y.

[21] Appl. No.: 136,623

[22] Filed: Oct. 13, 1993

[30] Foreign Application Priority Data

Oct. 14, 1992 [EP] European Pat. Off. .............. 92203157

[51] Int. Cl.⁶ ................................................. H04M 11/00
[52] U.S. Cl. ................... 379/98; 375/222; 379/90
[58] Field of Search .................... 379/90, 93, 96–99, 379/387, 388, 399, 414, 423, 441–444; 375/8, 121; 178/70 R

[56] References Cited

U.S. PATENT DOCUMENTS 4,300,013  11/1981  Rademaker ..................... 178/70 R
4,987,586   1/1991  Gross et al. ....................... 379/93
5,127,046   6/1992  Malm .............................. 379/98

FOREIGN PATENT DOCUMENTS 663305  11/1987  Switzerland .

OTHER PUBLICATIONS

J. R. Baird et al, "Optoelectronics as Applied to Functional Electronic Blocks", Proceedings of the IEEE, Dec. 1964, pp. 1529–1536.

*Primary Examiner*—Wing F. Chan
*Attorney, Agent, or Firm*—David R. Treacy

[57] ABSTRACT

Telephone apparatus including a loudspeaker and a microphone, a speech transmission network that on the one side is coupled to the loudspeaker and the microphone and on the other side can be coupled to the telephone lines, and a modem having an input and an output, wherein the modem for AC-currents is directly coupled to the speech transmission network and for DC-currents is isolated from the speech transmission network. By these features it is possible to provide a telephone apparatus having the possibility of data-communication with as little as possible additional components, so that the telephone apparatus can be very low priced.

7 Claims, 4 Drawing Sheets

5,504,807

TELEPHONE APPARATUS WITH A CONTINUOUSLY-CONNECTED DC-ISOLATED MODEM

BACKGROUND OF THE INVENTION

The invention relates to a telephone apparatus including a loudspeaker and a microphone; a speech transmission network, that on the one side is coupled to the loudspeaker and the microphone and on the other side can be coupled to the telephone lines; and a modem having an input and an output.

Such a telephone apparatus is known from the Swiss patent 663305. Including a modem in a telephone apparatus in accordance with said publication has the advantage that circuits that are common to conventional stand alone modems and conventional telephones for voice communication, can be used in common instead of being provided twice. Such common circuits for example are the speech transmission network, the circuit to adapt the telephone or modem to the telephone lines and the keypad for the selection of numbers.

In the telephone apparatus according to the above mentioned Swiss patent a switch is provided to couple either the handset, comprising the microphone and the loudspeaker, or the modem with the speech transmission network. Such a switch commonly is in the form of a relay, which relay is a relatively expensive component in relation to the other components of a telephone apparatus.

SUMMARY OF THE INVENTION

The invention has for its object to provide a low priced telephone apparatus including a modem to be used for data communication. There is a large market for such low priced telephones, because many consumers nowadays want to make use of the advantages of datacommunication.

To this effect the invention provides a telephone apparatus of the above mentioned type characterized in that the modem for AC-currents is directly coupled to the speech transmission network and for DC-currents is isolated from the speech transmission network.

Accordingly the invention provides a telephone apparatus including a modem in which no longer a switch is necessary to choose between normal telephone operation for speech and modem operation. Because of the isolation of the modem for DC-currents from the speech network, the modem forms no unacceptable high load for the telephone lines, while also a high voltage isolation between the telephone part and the modem part is provided.

In accordance with a first embodiment of the invention the input and the output of the modem by means of respective DC-blocking means are coupled with the microphone and the loudspeaker respectively.

In accordance with a second embodiment of the invention the input and the output of the modem by means of an impedance element and DC-blocking means are coupled to the AC-path of the speech transmission network.

In the following the invention shall be further explained at the hand of four embodiments of the invention, with reference to the drawing.

BRIEF DESCRIPTION OF THE DRAWING

In the various figures identical parts have been indicated with identical reference numerals.

DESCRIPTION OF THE PREFERRED EMBODIMENT

Figure 1:
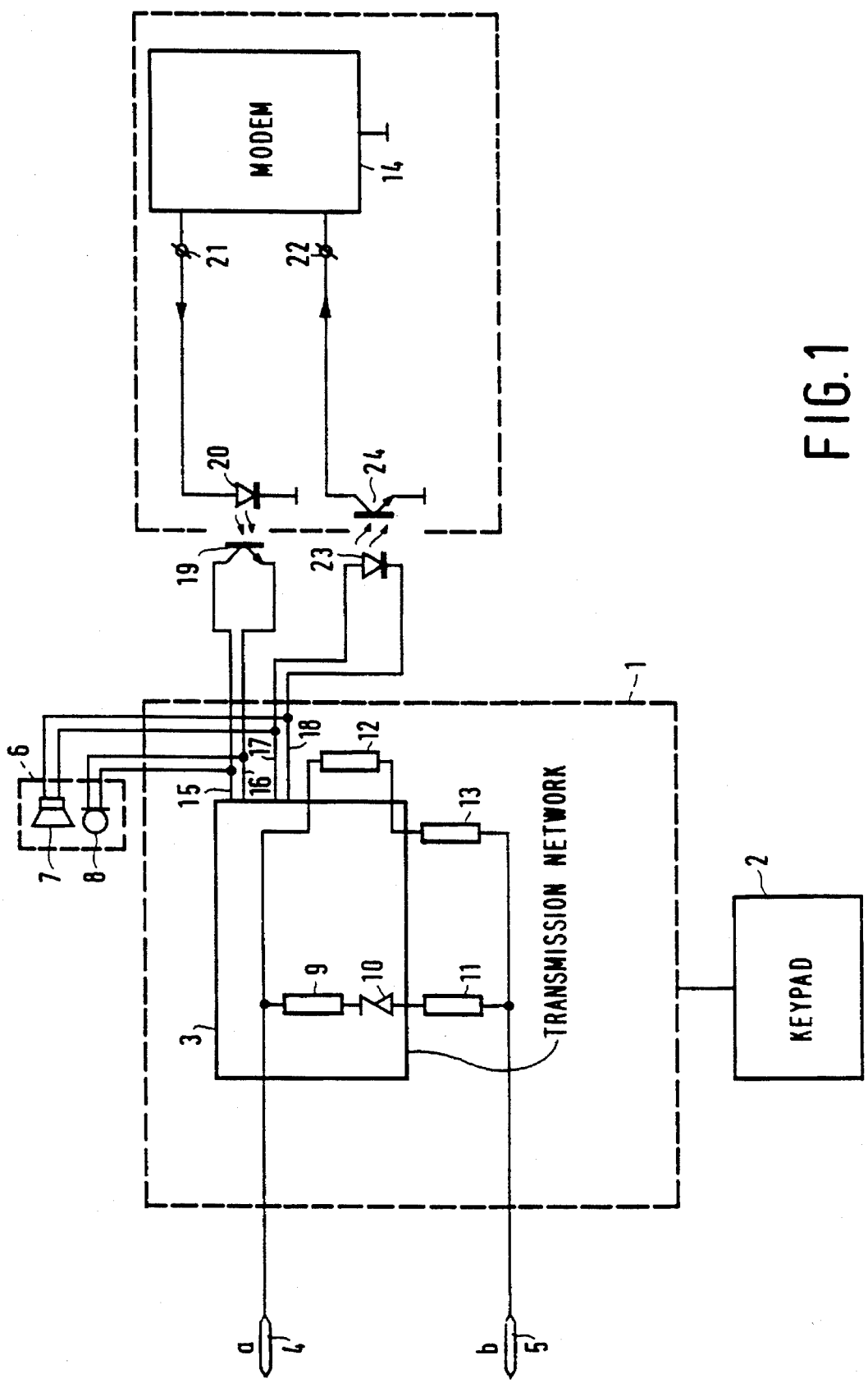
FIG. 1: A schematic diagram of a first version of a first embodiment of the telephone apparatus according to the invention.

The FIGS. 1–4 schematically show a telephone 1, having a keypad 2 and a speech transmission network 3. The telephone 1 is coupled to the telephone line terminals 4 and 5, commonly called a and b respectively. To the speech transmission network 3 by means of lines 15, 16, 17, and 18 a handset 6 is connected comprising a loudspeaker 7 and a microphone 8. For completeness sake it is observed that only those parts of a telephone apparatus are shown in the figures that are essential for a good understanding of the present invention. A modem telephone apparatus of course has a more complex structure than is shown in the figures. For those skilled in the art however, it will be clear how to embody the present invention in such a modem telephone apparatus.

The speech transmission network 3 is of the type comprising a DC-path and an AC-path. The DC-path comprises a series connection of an AC-blocking impedance 9, for example an inductance, a zener diode 10 and a DC adjustment impedance 11, for example a resistance. The elements 9 and 10 are provided inside the speech transmission network 3, which nowadays always is in the form of an integrated circuit for example, the IC's of the TEA 1060 series of Philips. The AC-path comprises the series connection of an AC-adjustment impedance 12, for example a resistor, and a DC-blocking impedance 13, for example a capacitor. Finally in all embodiments of the invention a modem 14, having an output terminal 21 and an input terminal 22, is provided.

The functioning of a telephone apparatus as shown in the FIGS. 1–4 is well known in the art and therefore will not be discussed in detail.

The essence of the invention is that the modem 14 is directly and constantly (continuously) coupled to the speech transmission network 3 without any switching means to select between voice operation through the handset or data transmission through the modem.

In the embodiment of FIG. 1 the modem 14 is coupled to the speech transmission network 3 by means of a pair of optocouplers. The output terminal 21 of the modem via a light emitting diode (led) is coupled to ground. A transistor 19, which together with the led 20 forms the first optocoupler, with its collector emitter path is coupled in parallel to the lines 15 and 16, which also lead from the speech transmission network 3 to the microphone 8. On the other side the lines 17 and 18, which lead from the speech transmission network 3 to the loudspeaker 7 are connected to the two terminals of a led 23. The collector emitter path of a transistor 24, which together with the led 23 forms the second optocoupler, is coupled between the input terminal 22 of the modem 14 and ground. By this configuration the modem 14 for AC-signals is permanently coupled in parallel to the handset, so that a user can use the modem or the handset without having to effect any switching action.

Further, because of the optocouplers it is assured, that no DC-currents flow to the modem, so that this modem under no circumstance will form a load for DC for the telephone line.

Figure 2:
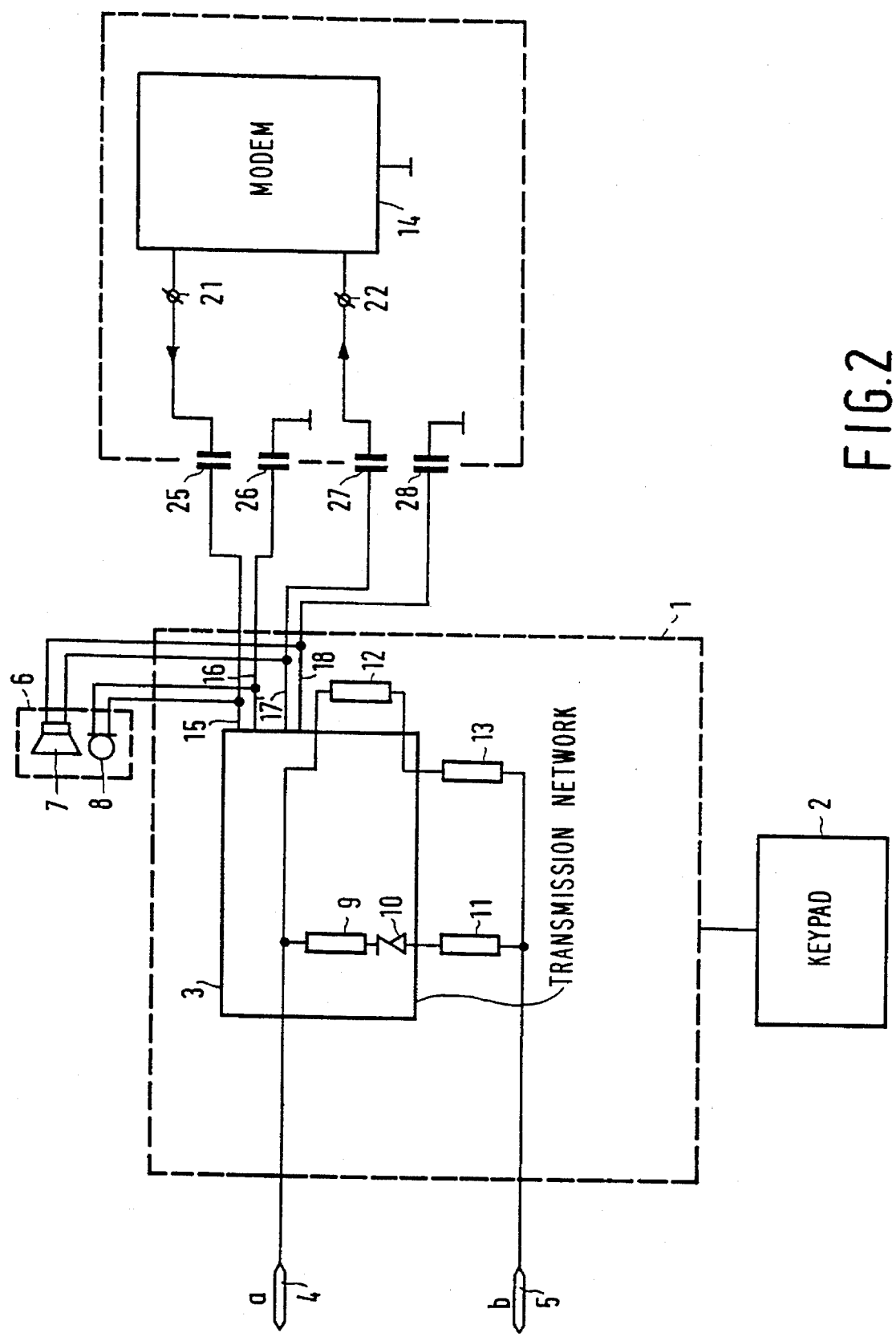
FIG. 2: A schematic diagram of a second version of the first embodiment.

The circuit of FIG. 2 shows a great resemblance with the embodiment of FIG. 1, but according to this version of the first embodiment the lines 15–18 each by means of its own capacitor, 25–28 respectively, are coupled to the modem circuit. Line 15 by means of capacitor 25 is coupled to the output terminal 21 of the modem and line 17 by means of capacitor 27 is coupled to the input terminal 22 of the modem. The lines 16 and 18 by means of capacitors 26 and 28 respectively are coupled to ground. The advantageous effects obtained by this embodiment are the same as those obtainable with the embodiment of FIG. 1.

Figure 3:
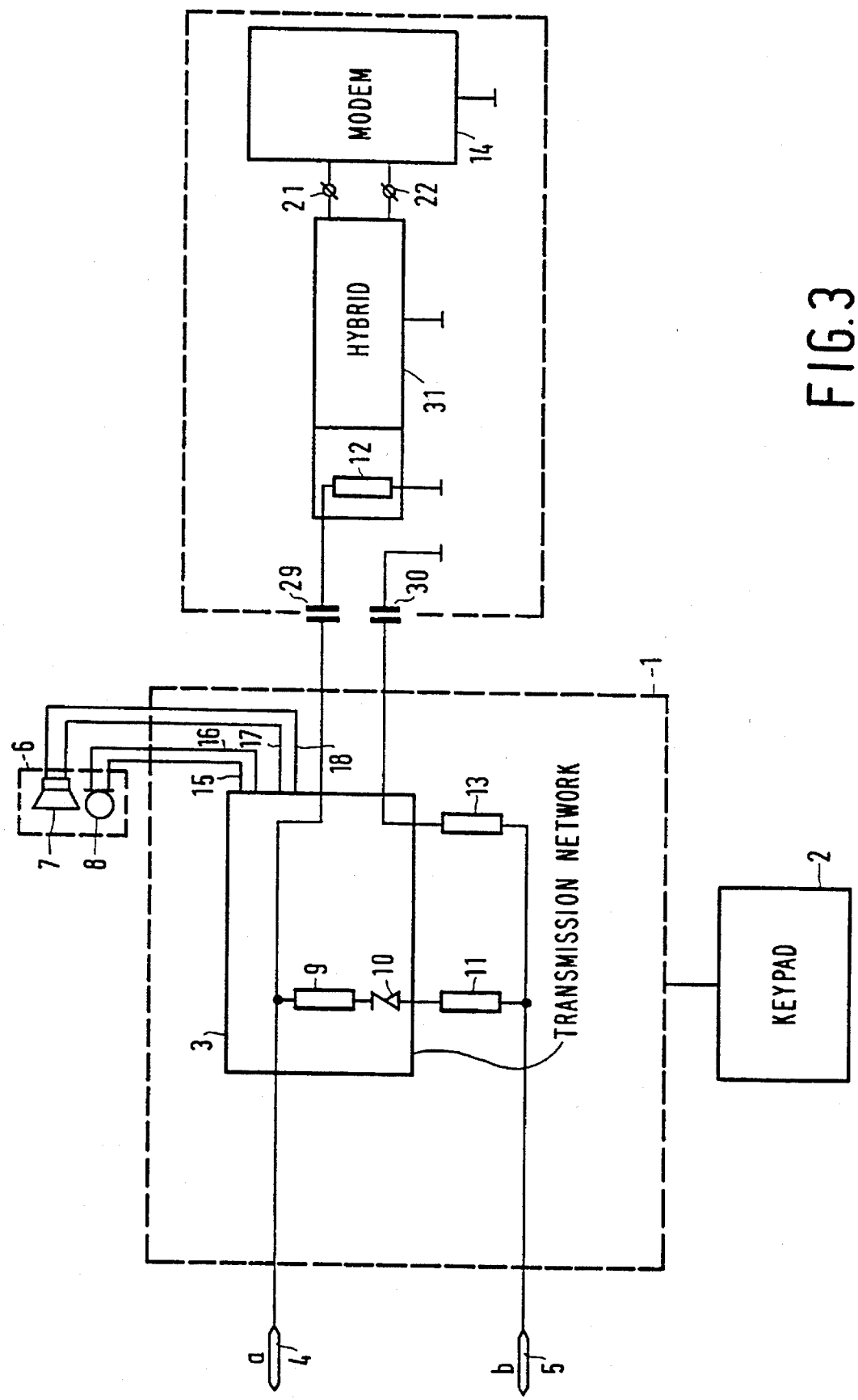
FIG. 3: A schematic diagram of a first version of a second embodiment of the telephone apparatus according to the invention.
Figure 4:
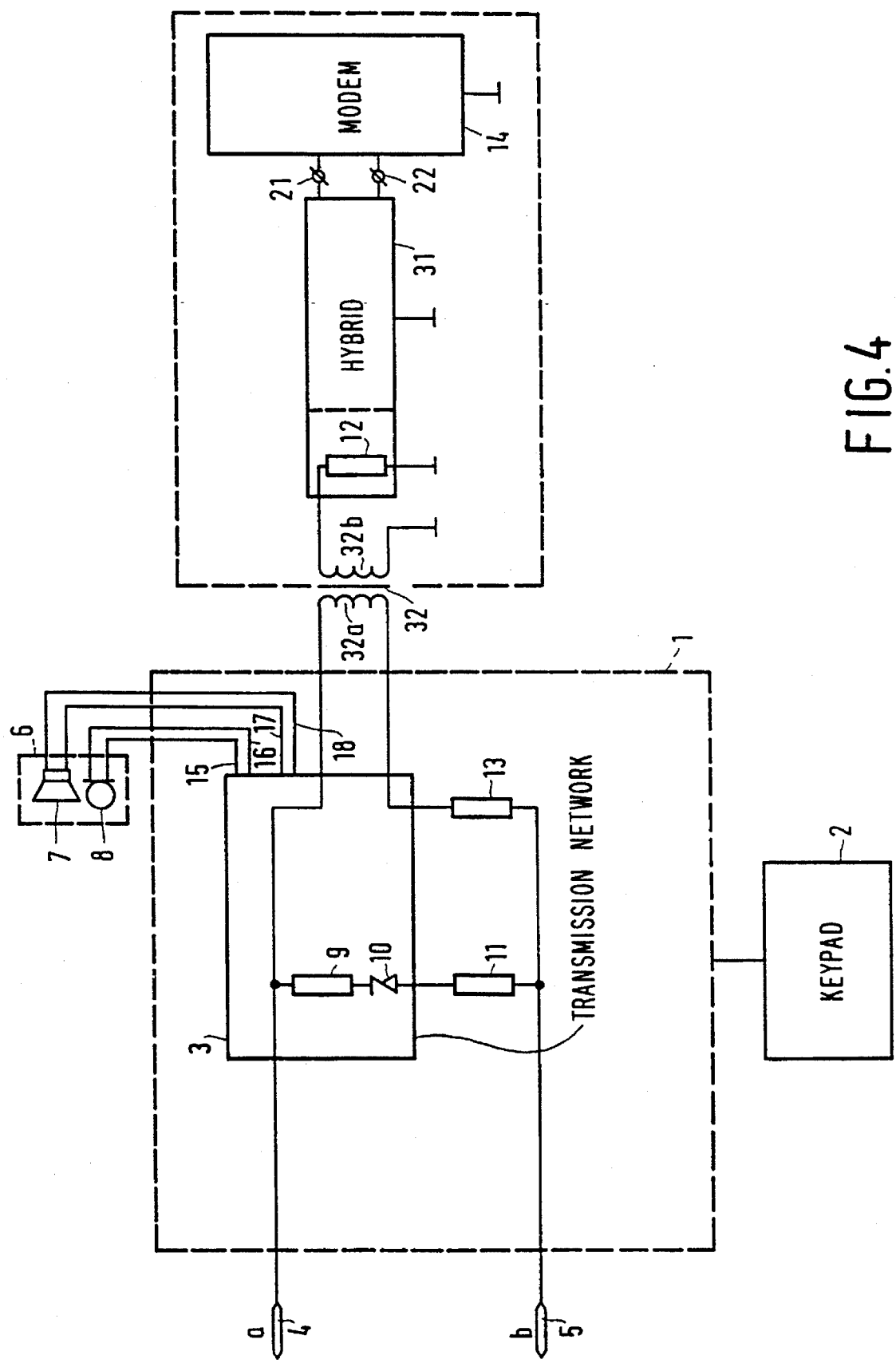
FIG. 4: A schematic diagram of a second version of the second embodiment.

In the second embodiment according to the FIGS. 3 and 4 the modem 14, instead of being coupled in parallel to the handset 6, is coupled directly into the AC-path of the telephone 1.

In the version of the second embodiment shown in FIG. 3 the modem 14 is coupled into the AC-path by means of two capacitors 29 and 30 and the impedance 12. The capacitor 29 on the one side is coupled with the a-telephone line and on the other side with one terminal of the impedance 12, the other terminal of which is coupled to ground. The capacitor 30 on one side is connected to one terminal of the impedance 13, the other terminal of which is coupled to the b-telephone line, while capacitor 30 on the other side is coupled to ground. The impedance 12 is coupled with the output terminal 21 and the input terminal 22 of the modem 14 by means of a conventional two-wire to four-wire conversion circuit or hybrid 31.

The version of the second embodiment shown in FIG. 4 is similar to that of FIG. 3 in that also in this embodiment the impedance 12 is coupled with the output terminal 21 and the input terminal 22 of the modem 14 by means of a conventional two-wire to tour-wire conversion circuit 31. Instead of capacitors however a transformer 32 is provided, the primary side 32a of which is connected in series with the a-telephone line and the impedance 13, while the secondary side 32b is coupled in parallel to the impedance 12.

Instead of providing the impedance 12 in the circuits according to the FIGS. 3a–4 at the input side of the two-wire to four-wire conversion circuit 31, it is also possible to provide this impedance at the side of the speech circuit 3, or between the terminals of the inductance 32a in FIG. 3 and 4 respectively.

It will be clear that also the embodiments of the FIGS. 3 and 4 provide the characteristic feature of the invention that the modem 14 for AC-currents is permanently coupled to the speech transmission network 3 of the telephone 1, without the necessity of switching means and that the modem does not form a load for DC-currents for the telephone lines, because it is isolated therefrom for DC.

We claim:

1. A telephone apparatus including:
   a loudspeaker and a microphone.
   a speech transmission network that is coupled on one side to the loudspeaker and microphone, and is arranged for coupling on the other side to telephone lines, and
   a modem having an input and an output,
   characterized in that the modem comprises means, free from switches, for
   1) direct coupling of AC currents to the speech transmission network, and
   2) isolating the modem with respect to DC currents from the speech transmission network.

2. A telephone apparatus as claimed in claim 1, wherein the speech transmission network includes an AC path and a DC path, arranged for coupling in parallel to the telephone lines,
   characterized in that the input and the output of the modem are coupled to said AC path by an impedance and DC blocking means.

3. A telephone apparatus as claimed in claim 2,
   characterized in that the impedance is connected to the AC path by a first capacitor and a second capacitor, and
   the impedance is coupled to the input and the output of the modem by a two-wire to four-wire conversion circuit.

4. A telephone apparatus as claimed in claim 2,
   characterized in that the impedance is coupled to the AC path by a transformer, and
   the impedance is coupled to the input and the output of the modem by a two-wire to four-wire conversion circuit.

5. A telephone apparatus including:
   a loudspeaker and a microphone.
   a speech transmission network that is coupled on one side to the loudspeaker and microphone, and is arranged for coupling on the other side to telephone lines, and
   a modem having an input and an output,
   characterized in that the modem comprises means, free from switches, for
   1) direct coupling of AC currents from loudspeaker connections of the speech transmission network to the modem input,
   1) direct coupling of AC currents from the modem output to microphone connections of the speech transmission network, and
   3) isolating the modem with respect to DC currents from the speech transmission network.

6. A telephone apparatus as claimed in claim 5,
   characterized in that the input of the modem is coupled in parallel to the loudspeaker by a first optocoupler, and
   the output of the modem is coupled in parallel to the microphone by a second optocoupler.

7. A telephone apparatus as claimed in claim 5,
   characterized in that the input of the modem is coupled in parallel to the loudspeaker by a first and a second capacitor, and
   the output of the modem is coupled in parallel to the microphone by a third and a fourth capacitor.

* * * * *